(12) United States Patent
Reudink

(10) Patent No.: US 8,099,057 B2
(45) Date of Patent: Jan. 17, 2012

(54) SPECTRUM SHARING USING COGNITIVE RADIOS

(75) Inventor: Douglas Reudink, Port Townsend, WA (US)

(73) Assignee: Empire Technology Development LLC, Wilmington, DE (US)

( * ) Notice: Subject to any disclaimer, the term of this patent is extended or adjusted under 35 U.S.C. 154(b) by 364 days.

(21) Appl. No.: 12/431,912

(22) Filed: Apr. 29, 2009

(65) Prior Publication Data

US 2010/0279680 A1    Nov. 4, 2010

(51) Int. Cl.
*H04B 17/00* (2006.01)
(52) U.S. Cl. .................. 455/67.13; 455/450; 455/226.1; 455/226.3
(58) Field of Classification Search ............... 455/450, 455/456.1, 67.13, 226.1, 226.2, 226.3
See application file for complete search history.

(56) References Cited

U.S. PATENT DOCUMENTS

| 6,894,985 B2 | 5/2005 | Billhartz | |
| 7,149,520 B2 | 12/2006 | Backes et al. | |
| 7,158,759 B2 | 1/2007 | Hansen et al. | |
| 2004/0259573 A1* | 12/2004 | Cheng | 455/456.3 |
| 2009/0074032 A1 | 3/2009 | Callaway | |

OTHER PUBLICATIONS

Jain et al, A Multichannel CSMA MAC Protocol with Receiver-Based Selection for Multihop Wireless Networks, 2001, 8 pages.
Niyato, Dusit, Competitive Pricing for Spectrum Sharing in Cognitive Radio Networks: Dynamic Game, Inefficiency of Nash Equilibrium, and Collusion; 2008, 11 pages.
Prompijit, Anwida, Cognitive Radio (CR), Nakagawa Laboratory, School of Open and Environmental Systems, 2006, 26 pages.
Ge, Feng et al, Cognitive Radio: From Spectrum Sharing to Adaptive Learning and Reconfiguration, 2008, 10 pages.
Pradhan, Amod, PCT International Search Report for PCT/US2010/032718, 2010, 16 pages.

* cited by examiner

*Primary Examiner* — Temica M Beamer
(74) *Attorney, Agent, or Firm* — Jensen & Puntigam, P.S.

(57) ABSTRACT

Base stations and mobile devices have limited radio frequency spectrum through which they may communicate. Moreover, this spectrum is usually owned by a party having proprietary control. In order to allow for spectrum sharing, cognitive base stations (CBS) may be configured to select a radio frequency channel owned by another entity for its own use, and to determine how much additional noise it will create for such other entity. Based on this determination, the additional noise may be monetized, so that spectrum owners may be compensated for the additional noise created by use of their radio frequency channel.

26 Claims, 7 Drawing Sheets

| Added Noise Due to B | A's Relative Capacity |
|---|---|
| 0 (B is not on) | 100% |
| .1 | 96% |
| .5 | 82% |
| 1 | 74% |
| 2 | 52% |

FIG. 5B

SPECTRUM SHARING USING COGNITIVE RADIOS

BACKGROUND

With the present explosive increase in wireless communications, available unreserved radio communications frequencies are rapidly decreasing. For example, in the United States, the Federal Communications Commission (FCC) has restricted a range of radio communications channels to government or military use. Other radio communications channels are licensed for commercial use, however a great many of these are already licensed by existing commercial radio stations, cellular communications providers, television broadcasters, and so forth. A similar situation exists in many developed countries of the world.

While a particular radio communications channel may be licensed for use throughout a particular territorial jurisdiction, such as the United States, it is likely that such channel is not in fact used all of the time in every geographical part of the jurisdiction. For example, while a commercial radio station may broadcast on a licensed frequency in one or more major metropolitan areas, its radio signals may not reach more remote areas, or areas obstructed by geographical features such as mountains and large buildings. Similarly, the commercial radio station may choose not to broadcast during certain times of the day, for example in the period between midnight and four o'clock AM, when the broadcast may not reach enough listeners to justify the costs of programming.

As a result, there are radio communications frequencies that are in fact available for opportunistic use without substantially interfering with communications transmitted by the license holder.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5B is a table illustrating an impact of a second entity's (B) transmission on a capacity of a first entity's (A) transmission on a selected RF channel;

DETAILED DESCRIPTION

Figure 1:
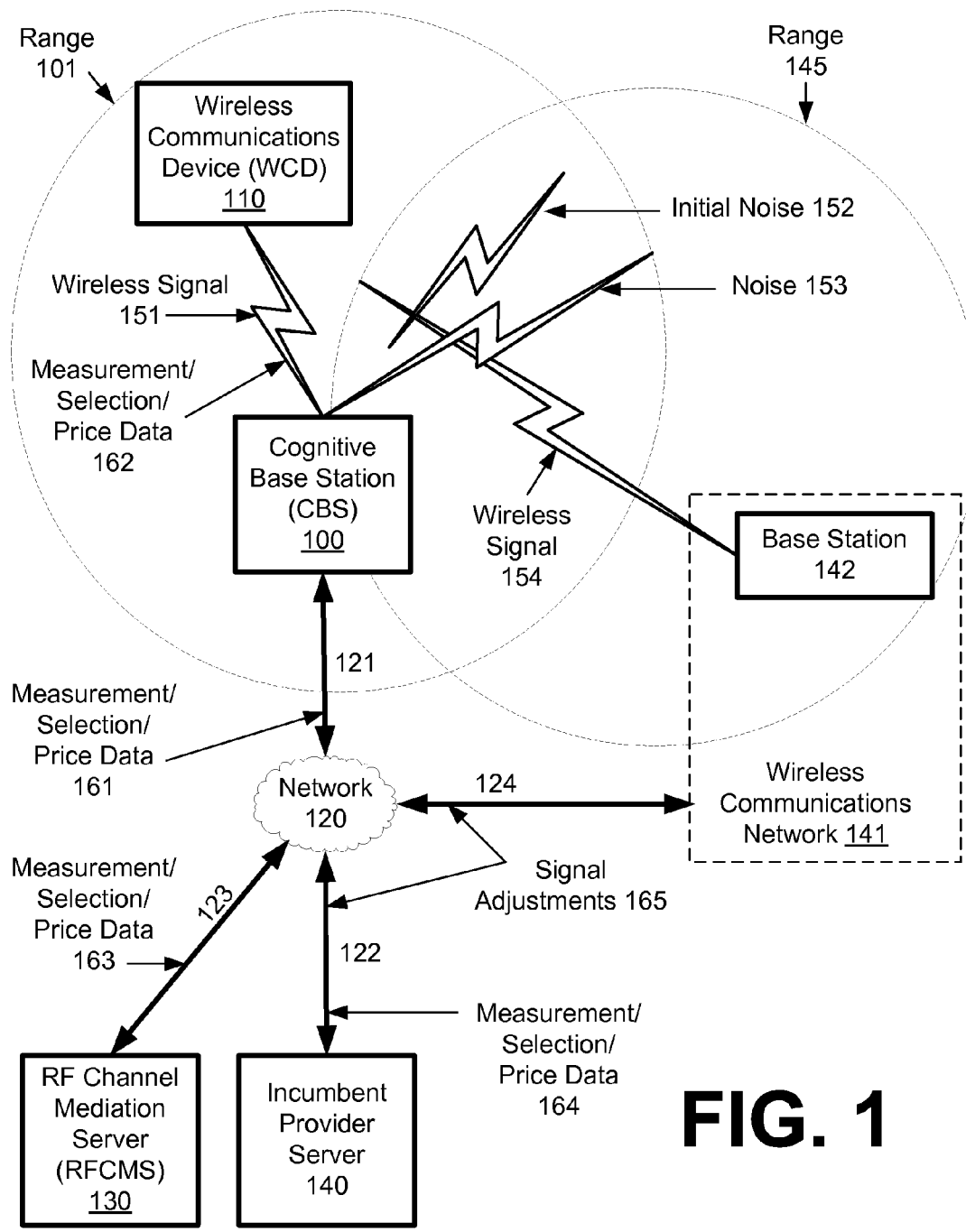
FIG. 1 is a block diagram of an example system including a Cognitive Base Station (CBS), Wireless Communications Device (WCD), and Radio Frequency Mediation Server (RFCMS), among various other components.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

A brief overview will facilitate understanding of this disclosure. In general, in the context of wireless communications, base stations and mobile devices have limited radio frequency spectrum through which they may communicate. Moreover, this spectrum is usually owned by a party having proprietary control. In order to allow for spectrum sharing, cognitive base stations (CBS) may be configured to determine how much additional noise will be created by loading an additional party onto a radio frequency channel. Based on this determination, the additional noise may be monetized, so that spectrum owners may be compensated for the additional noise created on their radio frequency channel.

For example, consider the following scenario. A second entity (B) uses a radio frequency channel that is owned, licensed, or otherwise controlled by a first entity (A). B's use of the radio frequency channel creates noise on the channel which interferes with and degrades signals transmitted by A. As a result, A experiences a reduced wireless communications network capacity. However, the harm to A in this scenario may be less than the benefit to B, making B's use of the channel desirable if A may be appropriately compensated. One aspect of the following disclosure provides approaches for measuring the reduced capacity and compensating A for the reduction.

Turning now to FIG. 1, a block diagram of an example system including a Cognitive Base Station (CBS) 100, Wireless Communications Device (WCD) 110, and Radio Frequency Mediation Server (RFCMS) 130, is provided, along with various other components, all arranged in accordance with the present disclosure. The other components in FIG. 1 include wireless communications network 141, which includes base station 142; network 120; and Incumbent Provider Server 140.

In FIG. 1, CBS 100 is illustrated as having a wireless transmission range 101, while base station 142 has a wireless transmission range 145. Range 101 may overlap with range 145. As a result, wireless signals from the CBS 100, such as noise 153, that are on a same Radio Frequency (RF) channel as a wireless signal 154 from base station 142 may interfere with and create noise and corresponding reduced capacity for wireless communications network 141. Some amount of initial noise 152 may also be present which may interfere to some extent with wireless signal 154 from base station 142, the initial noise 152 not being a result of transmissions generated by the CBS 100.

CBS 100 may communicate with WCD 110 using wireless signal 151. Measurement/Selection/Price data 162 may be among the data transmitted to and from WCD 110. CBS 100 may communicate with network 120 using network connection 121. Measurement/Selection/Price data 161 may be among the data transmitted to and from network 120. Network 120 may in turn be coupled to RFCMS 130 via a network connection 123. Measurement/Selection/Price data 163 may be among the data transmitted to and from RFCMS 130.

Thus there may be a communication link between CBS 100 and RFCMS 130 via network 120.

Network 120 may furthermore be coupled to Incumbent Provider Server 140 via network connection 122. Measurement/Selection/Price data 166 and signal adjustments 165 may be among the data transmitted to and from Incumbent Provider Server 140. Network 120 may also be coupled to wireless communications network 141 via network connection 124, thus implementing a communications link between Incumbent Provider Server 140 and wireless communications network 141. Signal adjustments 165 may be among the data transmitted to and from network 120 to wireless communications network 141.

In FIG. 1, the CBS 100 may be equipped to utilize a selected radio frequency channel for wireless communications with the WCD 110. The CBS 100 may also be equipped to gather information that is used in selecting the radio frequency channel. This information may be gathered by performing measurements at the CBS 100, and by receiving measurements made by other devices, such as WCD 110. The information that may be gathered may comprise, for example, signal power data, noise data, quality of service history data, and transmission direction data.

The signal power data and noise data may be referred to generally in FIG. 1 as "measurement data". Data 162 may include measurement data in embodiments where measurements are made by WCD 110 and transmitted via wireless signal 151 to the CBS 100. One or more of data 161, 163, and 164 may include measurement data in embodiments where measurement data is sent to another component, such as one or more of RFCMS 130 and Incumbent Provider Server 140, so that such other component may use the measurement data to undertake one or more of selecting an RF channel on behalf of the CBS 100 and determining a price for use by the CBS 100 of a selected RF channel. Quality of service history data and transmission direction data may also be included with the measurement data 161.

Data 162 may include selection data once an RF channel is selected for use by the CBS 100. In this case, information identifying the selected RF channel may be sent via wireless signal 151 as selection data 162 to the WCD 110. One or more of data 161, 163, and 164 may include selection data in embodiments where RF channel selection is performed by one or more of RFCMS 130 and Incumbent Provider Server 140 instead of by CBS 100. In this case, measurement data may be sent to such other component by CBS 100 as described above, and selection data may be returned by such other component to the CBS 100. One or more of data 161, 163, and 164 may otherwise include selection data in embodiments where RF channel selection may be performed by CBS 100 and then reported to another component such as one or more of RFCMS 130 and Incumbent Provider Server 140.

Data 162 may include price data in embodiments where price data will affect charges to the user of the WCD 110. In such a scenario, price data may be sent to WCD 110 via wireless signal 151 to inform the user of price information and optionally to request user approval of a price prior to permitting the WCD 110 to transmit on a selected RF channel.

One or more of data 161, 163, and 164 may include price data in embodiments where price for use by the CBS 100 of one or more RF channels is provided to the CBS by one or more of RFCMS 130 and Incumbent Provider Server 140 via network connections 121, 122, and/or 123. In some embodiments, prices for a plurality of RF channels may be aggregated in the RFCMS 130 by communicating via 123 with one or more Incumbent Provider Servers such as 140. An appropriate RF channel and corresponding price may be selected on behalf of the CBS 100 by the RFCMS 130, or the CBS 100 may make its own selection. As will be shown below, functions discussed herein as associated with the RFCMS 130 may be implemented in the CBS 100 in some embodiments.

Signal adjustments 165 may include information and instructions from Incumbent Provider Server 140 to base station 142 to modify a wireless signal such as 154 in response to information regarding CBS 100 use of a particular RF channel. For example, Incumbent Provider Server 140 may instruct base station 142 to decrease power, increase power, or change direction of signal 154 in response to CBS 100 use of a same RF channel.

FIG. 1 could be arranged in a variety of alternative embodiments. For example, in some embodiments, network 120 could be dispensed with in favor of direct connections between one or more of CBS 100, RFCMS 130, Incumbent Provider Server 140, and wireless communications network 141.

In some embodiments, the ranges 101 and 145 do not overlap. Even though range 145 may be outside of range 101, signals generated by CBS using a same channel as base station 142 may create noise within range 145. The systems and methods provided herein apply equally to this scenario.

In some embodiments, CBS 100 may comprise base station features and components as are currently used or may be future developed in the context of cellular telephone communications systems. In addition to such features and components, CBS 100 may comprise features and components as described in connection with FIG. 3, below. It should be noted however that CBS 100 may also be used in the context of other wireless communications systems such as wireless radio and television communications.

Likewise, in some embodiments, WCD 110 may comprise a cellular telephone or similar type device. In other embodiments, WCD 110 may be any of a wide variety of devices such as automobile, airplane, and boat navigation systems, laptop computers, Personal Digital Assistants (PDAs), radios, televisions, or other wireless communications devices. Aspects of WCD 110 are described in greater detail with reference to FIG. 4.

In some embodiments, WCD 110 may be a cellular telephone or similar type device. In other embodiments, WCD 110 may be any of a wide variety of devices such as automobile, airplane, and boat navigation systems, laptop computers, Personal Digital Assistants (PDAs), or other wireless communications devices. Aspects of WCD 110 are described in greater detail with reference to FIG. 4.

Figure 2:
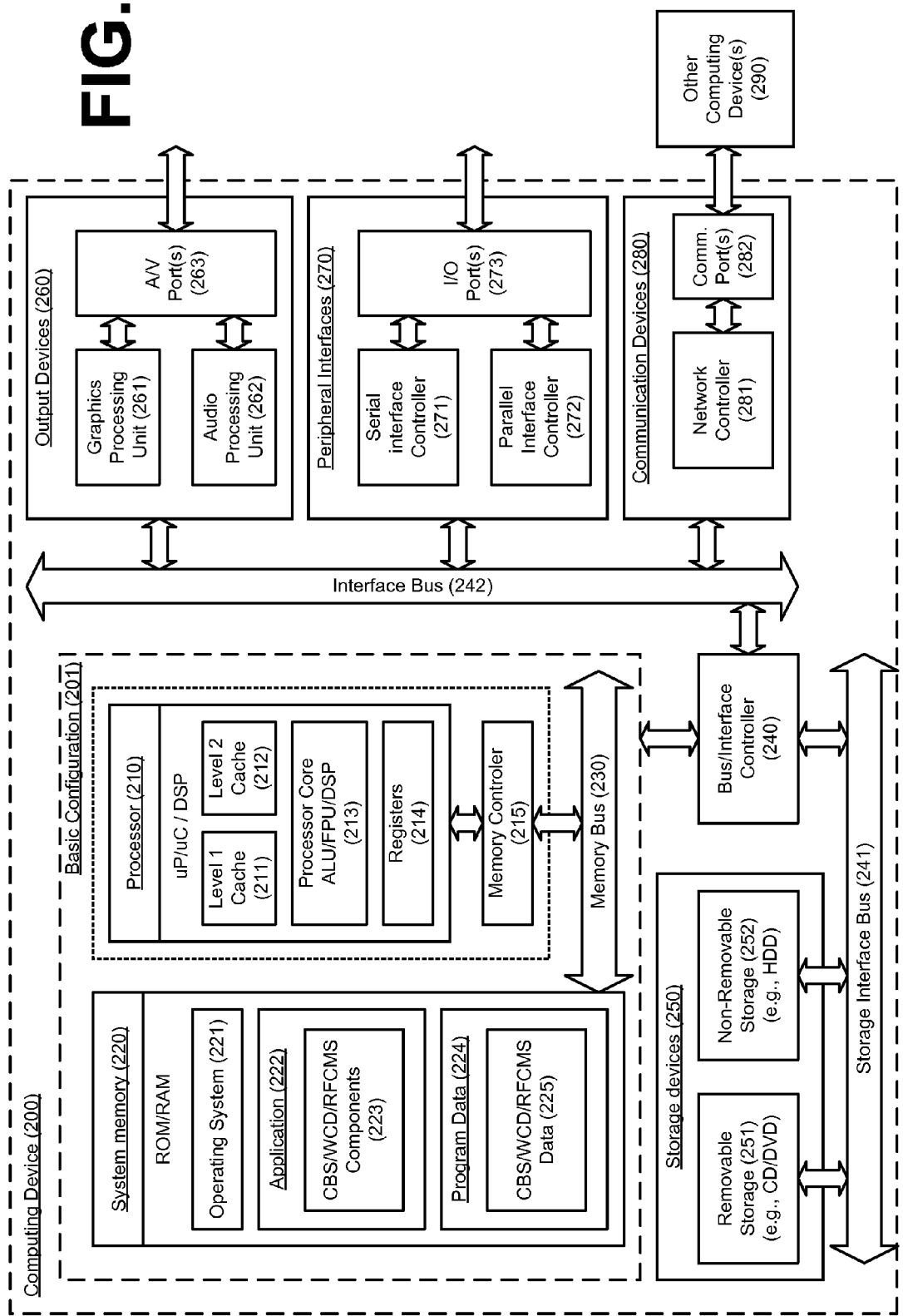
FIG. 2 is a block diagram illustrating an example computing device that may serve as any of the computing devices illustrated in FIG. 1.

FIG. 2 is a block diagram illustrating an example computing device 200 that may serve as any of the computing devices illustrated in FIG. 1, arranged in accordance with the present disclosure. More particularly, computing device 200 may be used for one or more of CBS 100, WCD 110, or RFCMS 130. In a very basic configuration 201, computing device 200 typically includes one or more processors 210 and system memory 220. A memory bus 230 may be used for communicating between the processor 210 and the system memory 220.

Depending on the desired configuration, processor 210 may be of any type including but not limited to a microprocessor (µP), a microcontroller (µC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Figure 3:
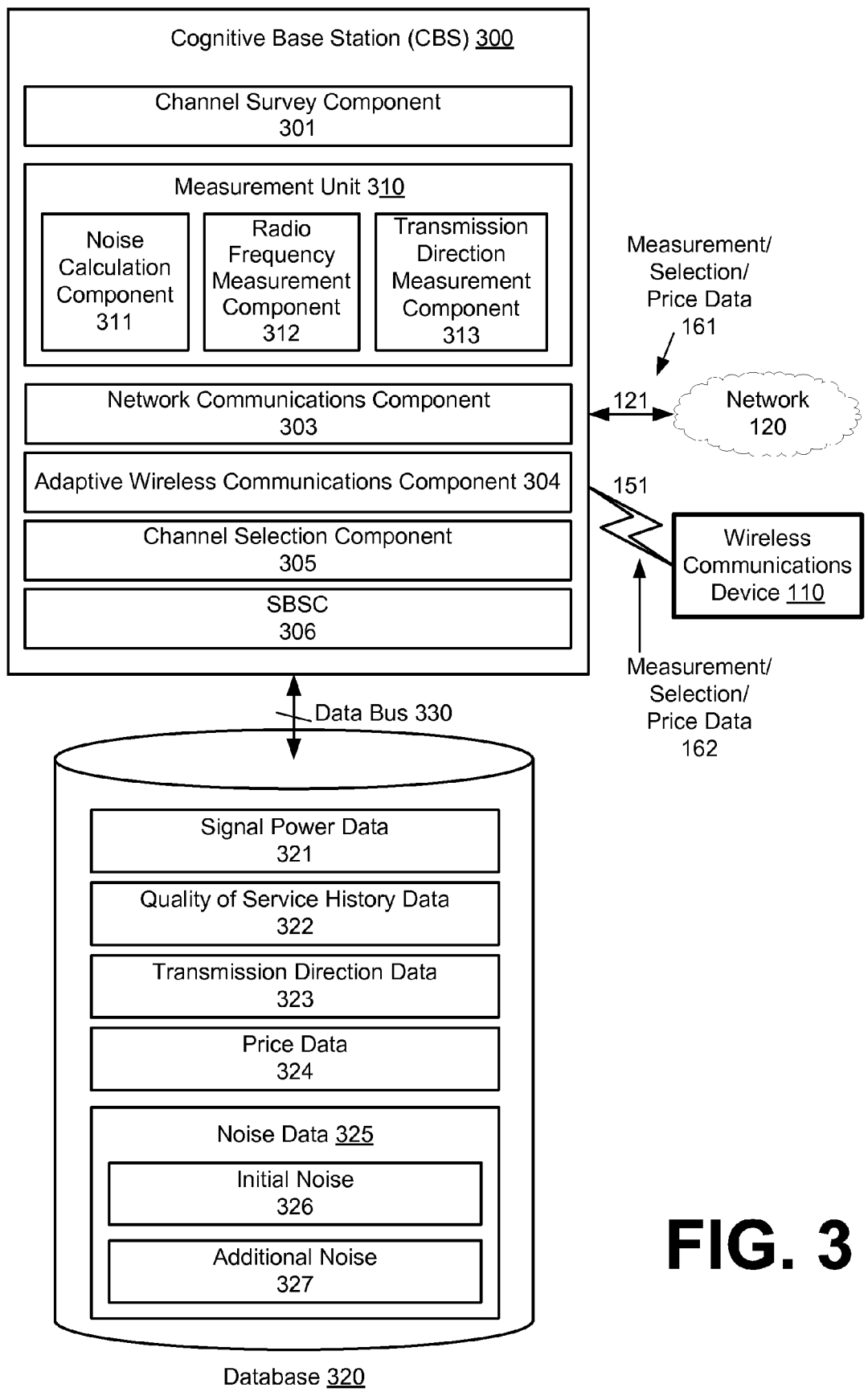
FIG. 3 is a block diagram of an example CBS component.
Figure 4:
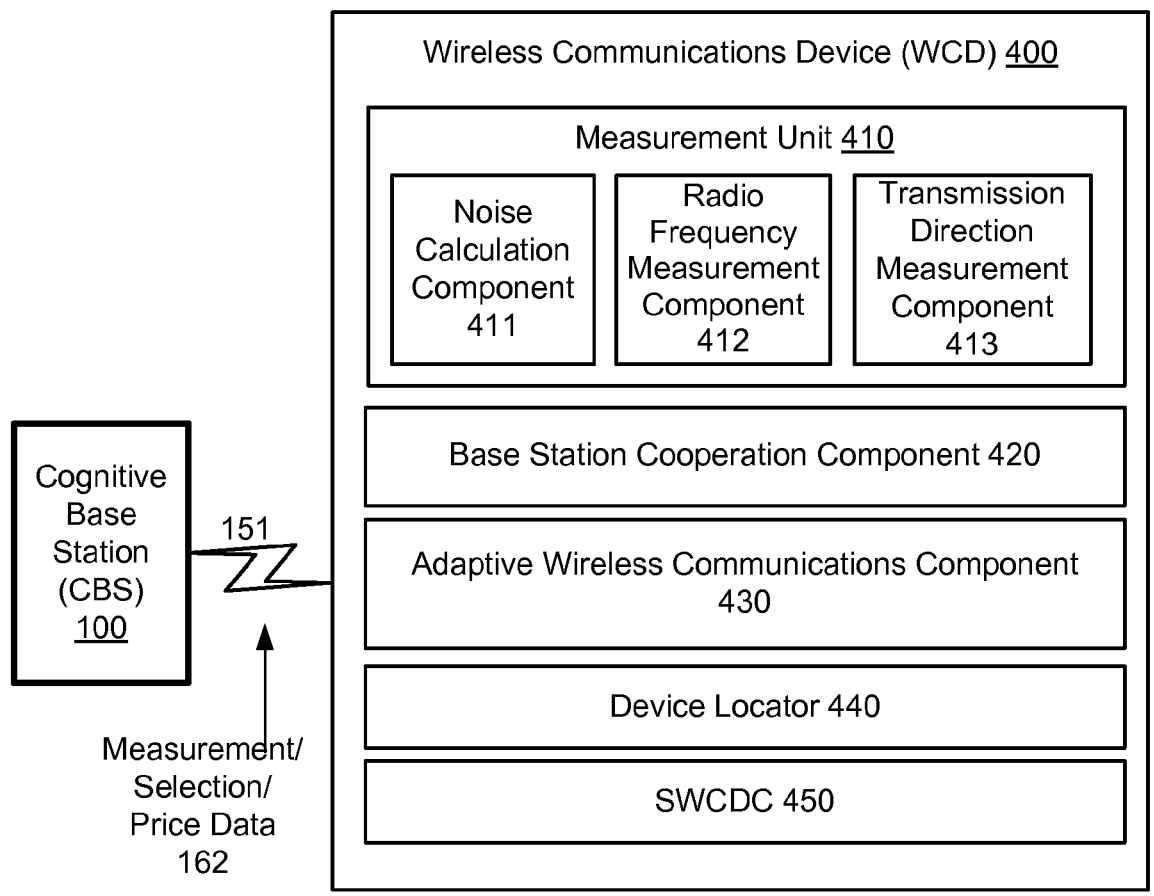
FIG. 4 is a block diagram of an example WCD component.

Depending on the desired configuration, the system memory 220 may be of any type including but not limited to volatile memory (such as RAM), non-volatile memory (such as ROM, flash memory, etc.) or any combination thereof. System memory 220 typically includes an operating system 221, one or more applications 222, and program data 224. Application 222 may include CBS/WCD/RFCMS components 223 and CBS/WCD/RFCMS data 225, depending on whether device 200 implements a CBS 100, WCD 110, or RFCMS 130. These components and data are described in greater detail in FIGS. 3-5. In some embodiments, application 222 may be arranged to operate with program data 224 on an operating system 221 such that the various features and functions described below with reference to FIGS. 3-5 are implemented. This described basic configuration is illustrated in FIG. 2 by those components within dashed line 201.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 220, removable storage 251 and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 include a serial interface controller 271 or a parallel interface controller 272, which may be configured to communicate with external devices such as input devices (e.g., keyboard, mouse, pen, voice input device, touch input device, etc.) or other peripheral devices (e.g., printer, scanner, etc.) via one or more I/O ports 273. An example communication device 280 includes a network controller 281, which may be arranged to facilitate communications with one or more other computing devices 290 over a network communication via one or more communication ports 282.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media.

Computing device 200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 200 may also be implemented as a personal computer including laptop computer and non-laptop computer configurations, a server computer, and a base-station or cognitive base station device.

FIG. 3 is a block diagram of an example CBS component 300. CBS component 300 may include a channel survey component 301, measurement unit 310 which may include noise calculation component 311, radio frequency measurement component 312, and transmission direction measurement component 313, network communications component 303, adaptive wireless communications component 304, channel selection component 305, and Standard Base Station Components (SBSC) 306. FIG. 3 also illustrates network 120, WCD 110, and database 320.

Database 320 may include a variety of data, including signal power data 321, quality of service history data 322, transmission direction data 323, price data 324, and noise data 325 which may further includes initial noise data 326 and additional noise data 327.

In FIG. 3, CBS 300 may be coupled to network 120 via network connection 121. Measurement/selection/price data 161 may be exchanged over network connection 121, as illustrated in FIG. 1. CBS 300 may also be coupled to WCD 110 via wireless signal 151. Measurement/selection/price data 162 may be exchanged over wireless signal 151, as illustrated in FIG. 1. CBS 300 is also coupled to database 320 via data bus 330. The various components of the CBS 300 may store and retrieve data in the database 320 via the data bus 330.

CBS 300 is a base station equipped to utilize a selected radio frequency channel for wireless communications. In general, CBS 300 may survey a plurality of frequency channels by gathering data regarding such channels. A frequency channel may then be selected by the CBS 300 itself, or by another component on behalf of the CBS 300, such as by RFCMS 130 in FIG. 1. Data regarding the selected channel and CBS 300 use thereof may be utilized to determine a price for the CBS 300 use of the selected channel. An adaptive wireless communications component 304 may be employed for transferring wireless communications between the CBS 300 and a wireless communications device using the selected radio frequency channel. Transferring wireless communications may comprise, for example, sending wireless communications, receiving wireless communications, or sending and receiving wireless communications.

CBS 300 may comprise, in some embodiments, a channel survey component 301 that determines signal power of a plurality of radio frequency channels. Channel survey component 301 may also determine an amount of noise on one or more of the plurality of radio frequency channels, quality of service history data for one or more of the plurality of radio frequency channels, and transmission directions associated with one or more of the plurality of radio frequency channels.

In some embodiments, channel survey component 301 may make determinations by interacting with measurement unit 310. For example, channel survey component 301 may determine signal power of a plurality of radio frequency channels by instructing radio frequency measurement component 312 to measure signal power of signals received on desired frequency channels. If measurements are performed by frequency measurement component 312 automatically or otherwise without any need for instructions from channel survey component 301, then channel survey component 301 may receive the appropriate measured data from frequency measurement component 312. Similarly, channel survey component 301 may determine an amount of noise on one or more of the plurality of radio frequency channels by interacting with the measurement unit 320 and noise calculation component 311. Also, channel survey component 301 may determine transmission directions associated with one or more of the plurality of radio frequency channels by interacting with the measurement unit 320 and transmission direction measurement component 313.

In some embodiments, channel survey component 301 may make determinations by interacting with database 320. For example, in embodiments where one or more of measurement unit 310, frequency measurement component 312, noise calculation component 311, and transmission direction measurement component 313 deposit measured or calculated data directly in database 320 as one or more of signal power data 321, noise data 325, and transmission direction data 323, respectively, the channel survey component 301 may determine values of such measured data by querying the database 320. Quality of service history data 322 for one or more of the plurality of radio frequency channels may also be determined by querying the database 320. Quality of service history data 322 may be initially stored in the database 320 by the channel survey component 301 or another component of the CBS 300, for example by measuring service quality parameters when interacting with a WCD 110, and placing data in database 320, or by retrieving quality of service history data 322 from network 120 and placing it in database 320.

In some embodiments, channel survey component 301 may make determinations by interacting other devices, such as WCD 110. For example, channel survey component 301 may determine signal power of one or more of the plurality of radio frequency channels by sending a signal power request to a remote device, such as WCD 110 or another device coupled to CBS 300 via network 120, and receiving signal power data from the remote device. This data may then be stored in database 320. Channel survey component 301 may likewise determine an amount of noise on one or more of the plurality of radio frequency channels, transmission directions associated with one or more of the plurality of radio frequency channels, and quality of service history data by sending appropriate requests for such data to WCD 110 or other remote devices.

Example measurement components 311, 312, and 313, as well as any other measurement components, may be provided in a measurement unit 310. Measurement unit 310 may in some embodiments provide certain support functions for measurement components 311, 312, or 313, such as signal reception, down-conversion and subsequent processing, or interface to network communications component 303, adaptive wireless communications component 304, or database 320. However, alternative embodiments are feasible in which measurement unit 320 does not provide any such support functions. Measurement unit 310 as used herein refers to a collection of any measurement components as may be provided in the CBS 300.

A noise calculation component 311 may be configured to calculate an amount of noise on one or more of the plurality of radio frequency channels that may be utilized by CBS 300. Noise calculation component 311 may measure noise as well as perform noise calculations, or may utilize measurement data gathered by another component. In general, there are three types of noise that may be measured or calculated. The first is existing noise on an RF channel, such as initial noise 152 in FIG. 1. This is noise that is not due to any transmission of the CBS 300. Initial noise 326 may be stored with noise measurements 325. The second is additional noise that may be due to transmissions of the CBS on an RF channel. The third is predicted or prospective additional noise that may be caused by a prospective future transmission on an RF channel by the CBS 300. Additional noise, whether of a predicted/prospective nature or otherwise, may be stored for example as noise 327 with noise measurements 327. As will be discussed further below, noise data 325 may be used to determine the impact of any transmissions by a second entity using CBS 300 on a radio channel owned by a first entity, which information may be utilized to determine an appropriate price for use by CBS 300 of an RF channel.

Sources of noise may include, for example, so-called man made noise which is caused by automobile ignition systems, some types of lighting, out of band emissions produced by radio transmissions that leak into another band, and thermal noise due to heat. These noise sources are typically higher in urban areas than in rural areas. Other sources of noise arise from distant users transmitting in a same band. Examples include mobile stations on hilltops or skyscrapers. Occasionally, an antenna at a base station may be misaligned or the energy can skip across water or the atmosphere causing unwanted noise. Finally, there may be noise due to a network of cells and mobiles operating in a band of interest. Noise may be experienced by both base stations and mobile stations. A mobile station may generally be impacted by base station emissions. The base station associated with a mobile station can order a mobile station to scan frequencies of interest and report the signal levels, using for example a Received Signal Strength indication (RSSI). In some instances a mobile station may be arranged to scan all frequencies in advance of selecting a communication channel and report to the base station on a control channel. The CBS on the other hand may measure noise for example by measuring interfering signals and treating them as noise. Additionally, CBS's may be equipped with smart antennas permitting the determination of angles of arrival of the noise sources. This additional information may allow operation of certain channels in certain sectors, thereby reducing the interference into the incumbent network.

A radio frequency measurement component 312 may be configured to measure signal power of a plurality of radio frequency channels. Radio frequency measurement component 312 may be arranged to measure signal power for example using a spectrum analyzer or tuner device. Power measurements may be made by setting a receiver to a selected frequency and measuring the power in the receiver. The sensitivity of the measurement may depend at least in part on the bandwidth of the receiver. The narrower the bandwidth of the receiver the more sensitive the noise measurement, however, obtaining more sensitivity may require more radio receivers or alternatively requires more time to ascertain the power in a bandwidth of interest. A CBS 300 may be arranged to first choose to first make a rapid set of coarse noise power measurements to obtain a smaller set of candidate channels, and may then apply a finer scale noise power measurement to the smaller set.

Additional information that can be gathered by the CBS 300 may comprise a loading factor of the incumbent base stations. For example, the least used channels can be determined by measuring channel activity with the measuring unit 310. Low channel activity may generally result in lower noise and may be a factor in bandwidth selection by the CBS 300.

In some embodiments, signal power data may be used in noise calculations by the noise calculation component 311. Signal power data may also be used in selecting an RF channel for use by the CBS 300, as discussed below.

A transmission direction measurement component 313 may be configured to determine a transmission direction of a plurality of radio frequency channels. For example, transmission direction measurement component 313 measures whether the signals are coming from the north and going south, or vice versa. In some embodiments, transmission direction may be measured using multiple antennas, for example, a phased array antenna, or any two or more antennas which are a known distance d apart. By analyzing phases of signals received at the antennas, and comparing this information against the known distance between the antennas, a transmission direction of incoming radio signals may be determined. In some embodiments, transmission direction data may be used to determine a transmission direction for CBS 300. For example if northerly transmissions will interfere with an incumbent wireless network, while southerly transmissions will not, then the CBS 300 may restrict itself to southerly transmissions using a directional antenna. As a result, CBS 300 will create less noise on the incumbent network and the price for CBS 300 use of a selected RF channel will likely be less.

Network communications component 303 may be coupled to the network 120 and arranged for managing a network communication, the network communication comprising one or more of radio frequency channel selection data, the amount of noise, and the signal power. Managing the network communication may comprise, for example, sending radio frequency channel selection data across a network 120 and/or receiving radio frequency channel selection data from network 120, wherein the radio frequency channel selection data identifies a selected radio frequency channel, and wherein one or more of a signal power determined by the channel survey component 301 and an amount of noise calculated by the noise calculation component 311 are used in selecting the selected radio frequency channel. In embodiments where a channel selection is made by the CBS 300, the network communications component 303 may send data identifying the selection out to network 120 so that the entity owning the CBS 300 may be appropriately charged for using the selected channel. In embodiments where a channel selection is made by a component external to the CBS 300, such as by RFCMS 130 or Incumbent Provider Server 140 in FIG. 1, data determined by the channel survey component 301 may be sent by network communications component 303 to such external component for use in making the selection, and data identifying the selection may be received by network communications component 303 from such external component in response. The received data may then be used to configure the adaptive wireless communications component 304 to transmit on the selected RF channel.

A channel selection component 305 may use one or more of a signal power determined by the channel survey component 301, and an amount of noise calculated by the noise calculation unit 311 in selecting a channel for wireless communications between the CBS 300 and the WCD 110. Channel selection component 305 may also use a variety of other data in making a selection, for example quality of service history data 322, transmission data 323, and price data 324.

Channel selection component 305 may select an RF channel by comparing a variety of data pertaining to a plurality of channels to determine a best channel overall. This may be accomplished using database 320 queries and a selection algorithm that appropriately weights more important data against less important data to arrive at a selected channel.

In some embodiments, an example selection algorithm may favor a weak signal power in selecting an RF channel, because this indicates that a RF channel is not heavily used. Little additional noise 327 may also be preferred in channel selection, as this will minimize the impact on the incumbent network. Good quality of service history data 322 may be preferred in selecting a channel, as past good service indicates a likelihood of future good service. Transmission direction 323 may also be used if it is determined that CBS 300 transmissions may be made in a direction that will minimize impact on the incumbent network. Price data 324 may be used if available, favoring lower prices over higher prices.

Once channel selection component 305 selects an RF channel, selection identification information may be provided to adaptive wireless communications component 304 and wireless communications device 110, so that these components may use the selected channel for wireless communications.

It should be noted that in some embodiments, CBS 300 need not include channel selection component 305, and may instead send data from database 320 to another component via network 120. The selection may then be made on behalf of CBS and selection information provide to CBS 300.

Standard Base Station Components (SBSC) 306 may also be included in CBS 300. These components 306 may be any components currently in use or as may be future developed for base stations, and include for example aspects of a computing device 200 illustrated in FIG. 2. A recitation of SBSC 306 in detail is not provided here as such components are understood in the art.

FIG. 4 is a block diagram of an example WCD component 400 arranged in accordance with the present disclosure. WCD 400 may include a measurement unit 410, which may include noise calculation component 411, radio frequency measurement component 312, and transmission direction measurement component 313. WCD 400 may also include base station cooperation component 420, adaptive wireless communications component 430, device locator 440 and Standard Wireless Communications Device Components (SWCDC) 450. FIG. 4 also illustrates network CBS 100.

In FIG. 4, WCD 400 may be coupled to CBS 100 via wireless signal 151. Wireless signal 151 may include wireless signals on any of a plurality of RF channels. Measurement/selection/price data 162 may be exchanged over wireless signal 151, as illustrated in FIG. 1. Also, WCD 400 communications may be exchanged over wireless signal 151, for example telephone and data communications.

WCD 400 may be implemented, in some examples, as a wireless communications device equipped to measure radio frequencies on behalf of CBS 100 and to utilize a selected radio frequency channel for wireless communications. In general, WCD 400 may perform measurements on one or more RF channels by gathering data regarding such channels in response to an instruction from CBS 100 to perform the measurements. The measurements may be reported back to CBS 100, for example to a channel survey component 301.

WCD 400 may be furthermore configured to receive information identifying a selected channel, and to employ an adaptive wireless communications component 430 to send and receive subsequent wireless communications data to and from a CBS 100 using the selected radio frequency channel.

WCD 400 may comprise, in some embodiments, a base station cooperation component 420 configured to receive channel identification data from a base station 100, the channel identification data identifying one or more radio frequency channels for measurement by the WCD 400. The channel identification data may be received via 151 on an RF channel designated for administrative and control purposes. The channel identification data may include for example a packet with header identifying the packet as containing channel identification data, and body including channel identification data represented for example a frequency ranges or other identifying information.

The base station cooperation component 420 may be further configured to automatically initiate measurement by the measurement unit 410 of RF channels identified in the received channel identification data. For example, base station cooperation component 420 may automatically initiate measurement of radio frequency signal power measurement of identified radio frequency channels by the radio frequency measurement component 412. Base station cooperation component 420 may likewise initiate other measurements such as noise measurements by noise calculation component 411 and transmission direction by transmission direction measurement component 413. The initiation of measurements by base station cooperation component 420 may be accomplished, in some embodiments, by sending an appropriate instruction to an operating system of the WCD 400 to launch the measurement unit 410, and then passing RF channel identifiers into the measurement unit 410.

The measurement unit 410 may perform measurements requested by the base station cooperation component 420. For example, radio frequency measurement component 412 may be configured to measure radio frequency signal power of a plurality of radio frequency channels, as described with reference to element 312 in FIG. 3. Noise calculation component 411 transmission direction measurement component 413 may likewise be configured as described with reference to elements 311 and 313. Once any requested measurements are performed, measurement unit may pass measurement data back to the base station cooperation component 420.

The base station cooperation component 420 may be further configured to automatically send radio frequency measurements of the identified radio frequency channels to the CBS 100. The base station cooperation component 420 may use the wireless transmissions capability of the adaptive wireless communications component 430 to send and receive information to and from the CBS. The base station cooperation component 420 may pack and unpack data in wireless transmission packets as necessary, and may cause the adaptive wireless communications component 430 to use an RF channel designated for administrative and control purposes.

WCD 400 may also include a device locator component 440 configured to determine a location of the device. The device locator component 440 may include for example a Global Positioning System (GPS) unit, radio location component, or user-interface whereby a user may enter location information. The base station cooperation component 420 may be further configured to send device location data to the CBS 100 as a measurement for use in selecting an appropriate RF channel, e.g., where transmission direction affects additional noise produced on an incumbent network.

The adaptive wireless communications component 430 may used in connection with the base station cooperation component 420 as described above, and may also be configured to send and receive communications data to and from the CBS 100 on a selected channel, wherein the selected channel is identified in a communication from the CBS 100. Once selected channel information is received from the CBS 100, the adaptive wireless communications component 430 or base station cooperation component 420 may parse the received information and instruct the adaptive wireless communications component 430 to use the selected channel for subsequent device communications, such as voice and data communications desired by a user of the device.

The WCD 400 may also include Standard Wireless Communications Device Components (SWCDC) 450. These components 450 are any components currently in use or as may be future developed for wireless communications devices, and include for example aspects of a computing device 200 illustrated in FIG. 2. A recitation of SWCDC 450 in detail is not provided here as such components are understood in the art.

Figure 5A:
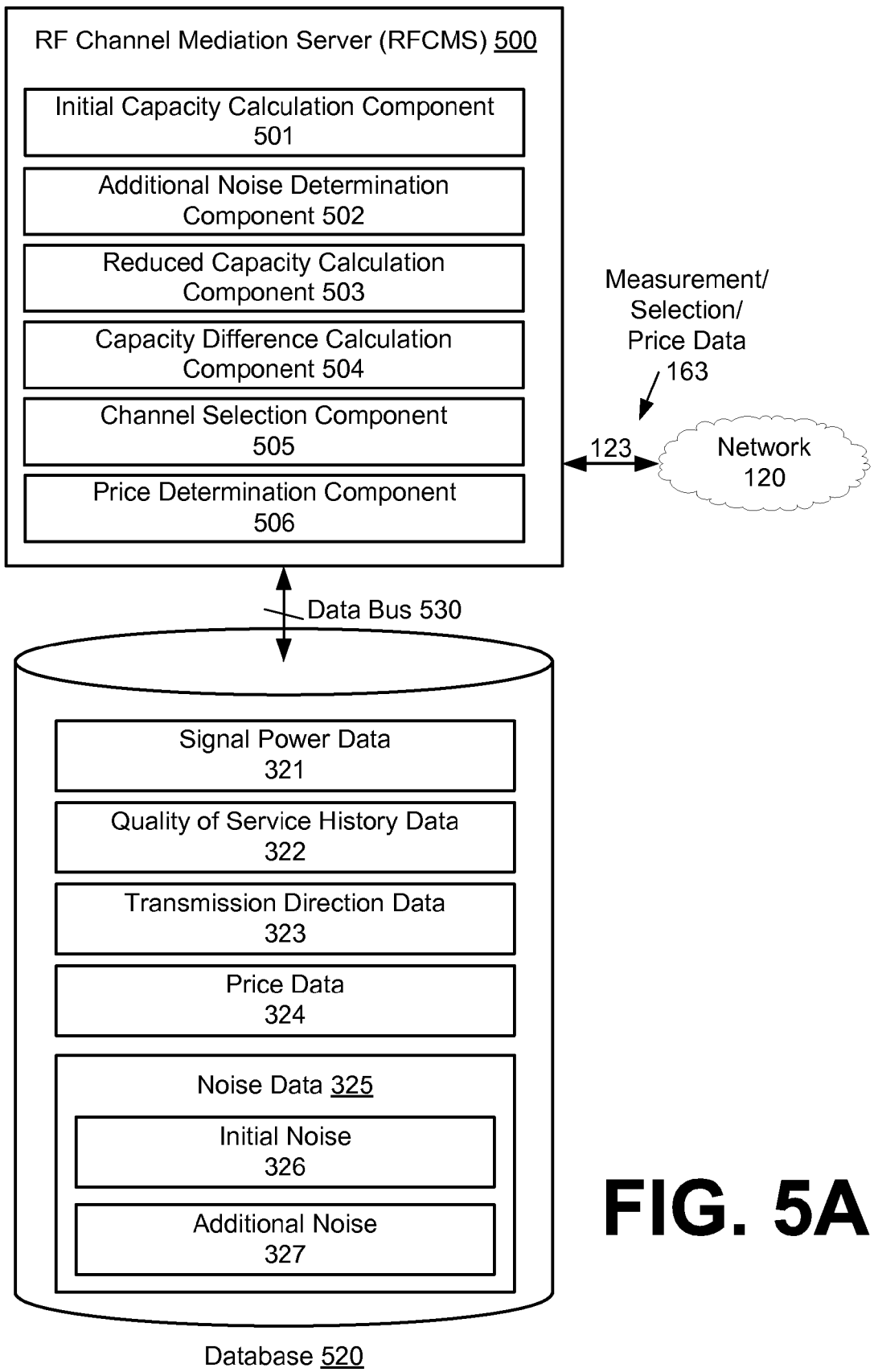
FIG. 5A is a block diagram of an example RFCMS component.

FIG. 5A is a block diagram of an example RFCMS component 500 arranged in accordance with the present disclosure. RFCMS 500 may include one or more of an initial capacity calculation component 501, an additional noise determination component 502, a reduced capacity calculation component 503, a capacity difference calculation component 504, a channel selection component 505, and price determination component 506. FIG. 5A also illustrates network 120 and database 530.

Database 530 may include a variety of data, including signal power data 321, quality of service history data 322, transmission direction data 323, price data 324, and noise data 325 which includes initial noise data 326 and additional noise data 327.

In FIG. 5A, RFCMS 500 may be coupled to network 120 via network connection 123. Measurement/selection/price data 163 may be exchanged over network connection 121, as illustrated in FIG. 1. RFCMS 500 may also be coupled to database 520 via data bus 530. The various components of the RFCMS 500 may store and retrieve data in the database 520 via the data bus 530.

RFCMS 500 may be a server equipped to mediate radio frequency channel use. In general, RFCMS 500 may interact with CBS 100 and/or Incumbent Provider Server 140 to facilitate RF channel selection, price determinations and billing for second party CBS 100 use of an RF channel available to an incumbent first party that owns or otherwise has a right to the RF channel, for example in wireless communications network 141. It should be noted at the outset that while one embodiment of an RFCMS 500 is provided herein, there are numerous alternatives that are possible by transferring some or all of the functions of the RFCMS 500 to CBS 100 and/or Incumbent Provider Server 140 or other devices as may be appropriate.

In some embodiments, RFCMS 500 may include an initial capacity calculation component 501 for calculating a wireless communications network 141 initial capacity available to a first entity using the wireless communications network 141, wherein the calculating accounts for any initial reduction in the initial capacity due to any initial noise 152 in a radio frequency channel used by the wireless communications network 141. For example, an initial capacity may be calculated using the following formula (Eq. 1) and equivalents thereof:

$$C1 = K \cdot \log\left(1 + \frac{\text{signal}}{\text{noise}}\right) \quad \text{(Eq. 1)}$$

where C1=initial capacity available to the first entity, K=bandwidth constant for wireless communications network 141, signal=signal power on a tested RF channel, and noise=initial noise 152.

In embodiments where RFCMS 500 functions are included in a CBS 100, the function of furthermore measuring the initial noise in the radio frequency channel and a signal power of the radio frequency channel for use in calculating the wireless communications network initial capacity may be performed. In embodiments where RFCMS 500 communicates with a remote CBS 100, measured noise, signal power, and other data for use in calculating the wireless communications network 141 initial capacity may be received from one or more remote devices, such as CBS 100 and WCD 110.

In some embodiments, RFCMS 500 may include an additional noise determination component 502 for determining an additional amount of noise 153 caused by a second entity's use of the radio frequency channel. The additional noise determination component 502 may receive an additional noise value from another component, such as CBS 100, or may undertake to provide such value itself, for example by interacting with a measurement unit such as 310 in FIG. 3 or 410 in FIG. 4. The additional amount of noise caused by a second entity's use of the radio frequency may comprise noise by a previous transmission by CBS 100, or may comprise a prospective amount of noise produced by a prospective future wireless communication by the second entity making use of the CBS 100.

In some embodiments, RFCMS 500 may include a reduced capacity calculation component 503 for calculating a wireless communications network 141 reduced capacity available to the first entity, wherein the calculating a wireless communications network 141 reduced capacity accounts for the initial noise 152 and the additional amount of noise 153 caused by the second entity's use of the radio frequency channel. For example, a reduced capacity may be calculated using the following formula (Eq. 2) and equivalents thereof:

$$C2 = K \cdot \log\left(1 + \frac{\text{signal}}{\text{noise} + \text{additional}}\right) \quad \text{(Eq. 2)}$$

where C2=reduced capacity available to the first entity, K=bandwidth constant for wireless communications network 141, signal=signal power on a tested RF channel, noise=initial noise 152, and additional=noise 153.

In some embodiments, RFCMS 500 may include a capacity difference calculation component 504 for calculating a capacity difference between the initial capacity C1 and the reduced capacity C2 for the purpose of determining a price to be charged by the first entity for allowing use of the radio frequency channel. The capacity difference calculation may be performed for example by taking the difference of the initial capacity C1 and the reduced capacity C2.

FIG. 5B is a table illustrating an impact of a second entity's (B) transmission on a capacity of a first entity's (A) transmission on a selected RF channel. In FIG. 5B, both A and B may be assumed to use a same channel at a same time. Also it may be assumed that A may be operating at full capacity under initial conditions that S=10 and N=1. Under conditions where B's impact is small, adding only a small amount of additional noise into A's system, A's capacity may be only slightly reduced. When B's signals may be equal to the noise that A had originally (N=1), A's capacity may drop to 74% of its original capacity. The last entry shows a case where B's noise on A may be twice as much as A experienced originally. In that case A's capacity may be nearly cut in half.

Knowing the capacity reduction provides A with a cost. If A calculates say the revenue per minute times the number of users at the base station 142, then if A has the impact of n users, in one example, a fair charge to B for using A's spectrum may be revenue per user times n.

This capacity difference calculation may be performed for a plurality of radio frequency channels for the purpose of determining a price for one or more of the plurality of radio frequency channels, and pricing information may then be sent to a channel selection component, whether such component is in the RFCMS 500 or instead at some other component such as the CBS 100 or Incumbent Provider Server 140. In embodiments where the channel selection component is external to the RFCMS 500, RFCMS 500 may transmit one or more of capacity difference information and price information across a network 120 to mediate radio frequency channel use. This information may then be utilized to determine prices and perform channel selection by such external component, such as the CBS 100 or Incumbent Provider Server 140. The RFCMS 500 may, for example, send capacity difference information corresponding to a plurality of RF channels to Incumbent Provider Server 140, which then calculates a prices for use of the channels. These prices are then returned to RFCMS 500 so that RFCMS 500 may select a channel. Alternatively, Incumbent Provider Server 140 may perform channel selection and RFCMS 500 may receive a selection identifying a radio frequency channel for wireless communications of the second entity.

In some embodiments, RFCMS 500 may include a channel selection component 505 for selecting a radio frequency channel for wireless communications of the second entity. Channel selection component 505 may include many of the same aspects as channel selection component 305 in FIG. 3. For this reason, database 520 is illustrated as including the same data 321-327 as database 320. The data in database 520 may be received from CBS 100 or any other components from which CBS 100 would retrieve the data. Channel selection component 505 may select an RF channel by comparing a variety of data 321-327 pertaining to a plurality of channels to determine a best channel overall. This may be accomplished using database 520 queries and a selection algorithm that appropriately weights more important data against less important data to arrive at a selected channel, as described with reference to FIG. 3. Once channel selection component 505 selects an RF channel, selection identification information may be provided to CBS 100 via network 120, so that CBS 100 may use the selected channel for wireless communications.

In some embodiments, RFCMS 500 may include a price determination component 506 for determining the price to be charged by the first entity for allowing use of the radio frequency channel. Price determination may be made based on price data 324 that may be received from one or more Incumbent Provider Servers 140. Price determinations may be sent to CBS 100 for CBS 100 use in channel selection or for CBS 100 record-keeping purposes. Price determinations may reflect the capacity difference experienced by the "first entity" or incumbent wireless communications network 141. A large capacity difference may yield a higher price than a small capacity difference. Ideally, a competitive arrangement may be supported by RFCMS 500 in which pricing data from a number of incumbent providers is available, and a competitive price for use of an RF channel may be achieved.

Figure 6:
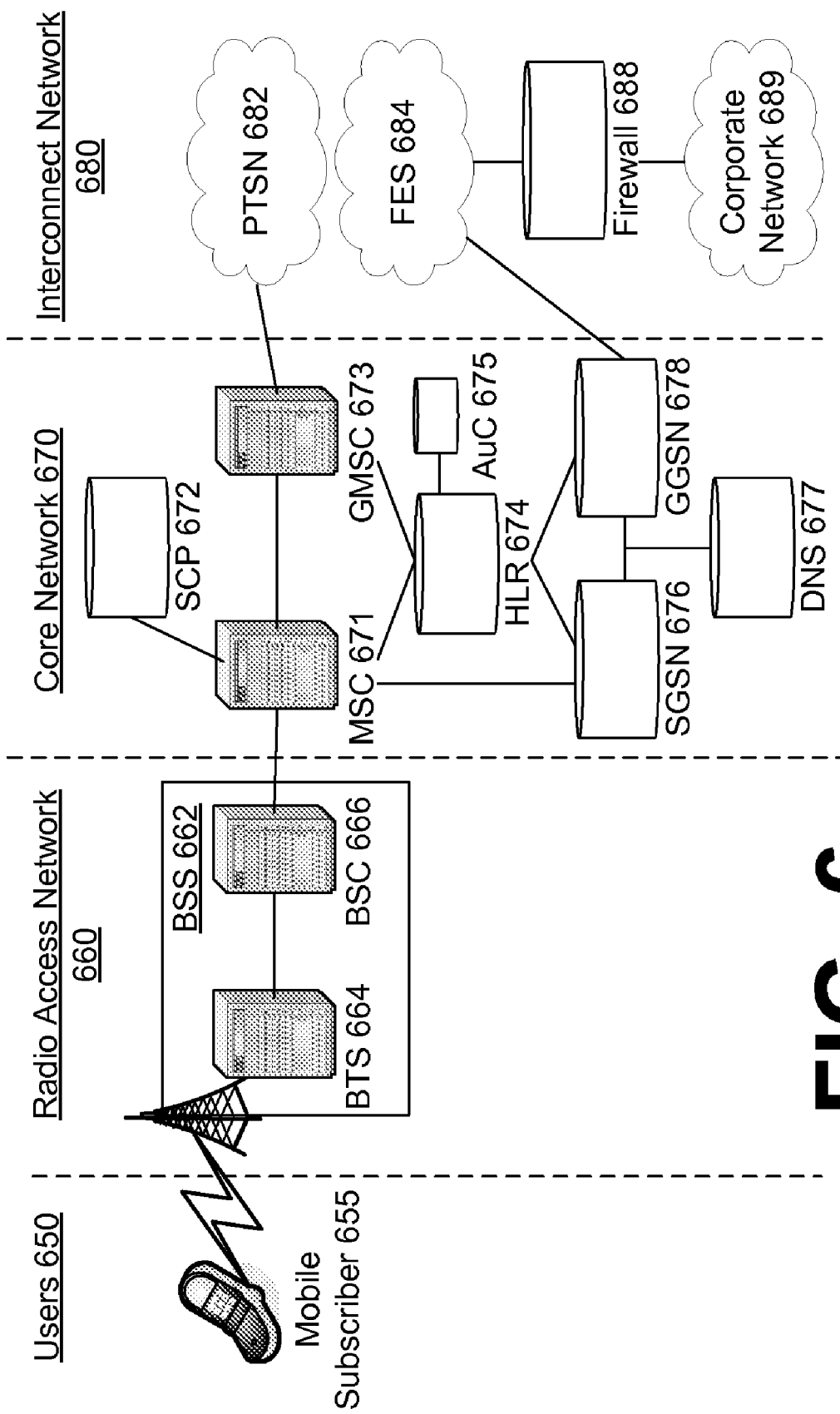
FIG. 6 is a block diagram of an example architecture of a wireless communications network, all arranged in accordance with at least some embodiments of the present disclosure.

FIG. 6 is a block diagram of an example architecture of a wireless communications network arranged in accordance with the present disclosure. FIG. 6 is intended as an example of just one of many architectures that may implement wireless communications network 141.

FIG. 6 illustrates an architecture of a typical GPRS network as segmented into four groups: users 650, radio access network 660, core network 670, and interconnect network 680. Users 650 may comprise a plurality of end users (though only mobile subscriber 655 is shown in FIG. 6). Radio access network 660 may comprise a plurality of base station subsystems such as BSSs 662, which include BTSs 664 and BSCs 666. Core network 670 may comprise a host of various network elements. As illustrated here, core network 670 may comprise Mobile Switching Center ("MSC") 671, Service Control Point ("SCP") 672, gateway MSC 673, SGSN 676, Home Location Register ("HLR") 674, Authentication Center ("AuC") 675, Domain Name Server ("DNS") 677, and GGSN 678. Interconnect network 680 may also comprises a host of various networks and other network elements. As illustrated in FIG. 6, interconnect network 680 may comprise Public Switched Telephone Network ("PSTN") 682, Fixed-End System ("FES") or Internet 684, firewall 688, and Corporate Network 689.

A mobile switching center may be coupled to a large number of base station controllers. At MSC 671, for instance, depending on the type of traffic, the traffic may be separated in that voice may be sent to Public Switched Telephone Network ("PSTN") 682 through Gateway MSC ("GMSC") 673, and/or data may be sent to SGSN 676, which may then send the data traffic to GGSN 678 for further forwarding.

MSC 671 may receive call traffic, for example, from BSC 666, and may then send a query to a database hosted by SCP 672. The SCP 672 may process the request and issues a response to MSC 671 so that it may continue call processing as appropriate.

The HLR 674 may be a centralized database for users to register to the GPRS network. HLR 674 may store static information about the subscribers such as the International Mobile Subscriber Identity ("IMSI"), subscribed services, and a key for authenticating the subscriber. HLR 674 may also store dynamic subscriber information such as the current location of the mobile subscriber. Associated with HLR 674 is AuC 675. AuC 675 may be a database that contains the algorithms for authenticating subscribers and includes the associated keys for encryption to safeguard the user input for authentication.

When a mobile subscriber turns on his or her mobile device, the mobile device may initiate an attach process by which the mobile device attaches to an SGSN of the GPRS network. In FIG. 6, when mobile subscriber 655 initiates the attach process by turning on the network capabilities of the mobile device, an attach request is sent by mobile subscriber 655 to SGSN 676. The SGSN 676 may query another SGSN, to which mobile subscriber 655 was attached before, for the identity of mobile subscriber 655. Upon receiving the identity of mobile subscriber 655 from the other SGSN, SGSN 676 may request more information from mobile subscriber 655. This information may be used to authenticate mobile subscriber 655 to SGSN 676 by HLR 674. Once verified, SGSN 676 may send a location update to HLR 774 indicating the change of location to a new SGSN, in this case SGSN 676. HLR 674 may notify the old SGSN, to which mobile subscriber 655 was attached before, to cancel the location process for mobile subscriber 655. HLR 674 then notifies SGSN 676 that the location update has been performed. At this time, SGSN 676 may send an Attach Accept message to mobile subscriber 655, which in turn may send an Attach Complete message to SGSN 676.

After attaching itself with the network, mobile subscriber 655 may then initiates an authentication process. In the authentication process, SGSN 676 may send the authentication information to HLR 674, which may send information back to SGSN 676 based on the user profile that was part of the user's initial setup. The SGSN 676 may then send a request for authentication and ciphering to mobile subscriber 655. The mobile subscriber 655 may use an algorithm to send the user identification (ID) and password to SGSN 676. The SGSN 676 may use the same algorithm and compares the result. If a match occurs, SGSN 676 may authenticate mobile subscriber 655.

Next, the mobile subscriber 655 may establish a user session with the destination network, corporate network 689, by initiating a Packet Data Protocol ("PDP") activation process. Briefly, in the process, mobile subscriber 655 may request access to the Access Point Name ("APN"), for example, UPS.com (e.g., which may be corporate network 689 in FIG. 5) and SGSN 676 may receive the activation request from mobile subscriber 655. SGSN 676 then may initiate a Domain Name Service ("DNS") query to learn which GGSN node has access to the UPS.com APN. The DNS query may be sent to the DNS server within the core network 670, such as DNS 677, which may be provisioned to map to one or more GGSN nodes in the core network 670. Based on the APN, the mapped GGSN 678 may access the requested corporate network 689. The SGSN 676 may then send to GGSN 678 a Create Packet Data Protocol ("PDP") Context Request message that contains necessary information. The GGSN 678 may send a Create PDP Context Response message to SGSN 676, which then may send an Activate PDP Context Accept message to mobile subscriber 655.

Once activated, data packets of the call made by mobile subscriber 655 may then access radio access network 660, core network 670, and interconnect network 680, in a particular fixed-end system or Internet 684 and firewall 688, to reach corporate network 689.

Thus, network elements that may invoke the functionality of the various components discussed herein may include but are not limited to Gateway GPRS Support Node tables, Fixed End System router tables, firewall systems, VPN tunnels, and any number of other network elements as required by the particular digital network.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The terms "channel" and "channel bandwidth" as used herein should not be construed as limiting. Channel bandwidths may depend on the selected wireless interface of a communications system. For example, a channel for a UHF TV may be approximately 6 MHz, while a CDMA channel may be approximately 1.25 MHz. The object of a CBS in accordance with some embodiments may be to obtain the use of an amount of spectrum for its individual use, independent of the channel spacing or modulation method employed by the incumbent provider. Thus the term "channel" may be used without limitation to any particular bandwidth.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art.

The invention claimed is:

1. A base station equipped to utilize a network and a selected one of a plurality of radio frequency channels for wireless communications with a wireless communication device, comprising:
    a channel survey component that determines a signal power associated with one or more of the plurality of radio frequency channels;
    a noise calculation component that calculates an amount of noise associated with one or more of the plurality of radio frequency channels;
    a network communications component coupled to the network and arranged for managing a network communication, the network communication comprising one or more of radio frequency channel selection data, the amount of noise, and the signal power, wherein the radio frequency channel selection data identifies a selected one of the plurality of radio frequency channels;
    wherein the selected one of the plurality of radio frequency channels is selected by either:
        a channel selection component within the base station, and wherein the selected one of the plurality of radio frequency channels is identified in radio frequency channel selection data in an outgoing network communication from the network communications component; or
        an incoming network communication received by the network communications component, wherein the network communications component is configured to send the amount of noise and the signal power in an outgoing network communication, and to receive the radio frequency channel selection data in the incoming network communication; and
    a wireless communications component configured for transferring wireless communications data between the wireless communications device and the base station using the selected one of the plurality of radio frequency channels.

2. The base station of claim 1, further comprising a channel selection component that uses the signal power determined by the channel survey component and the amount of noise calculated by the noise calculation unit in selecting the selected radio frequency channel for wireless communications between the wireless communications device and the base station.

3. The base station of claim 2, wherein the channel selection component uses quality of service history data in selecting the selected radio frequency communication channel for wireless communications between the wireless communications device and the base station.

4. The base station of claim 2, wherein the channel survey component further determines a first transmission direction associated with one or more of the plurality of radio frequency channels, and wherein the channel selection component also uses a comparison of the first transmission direction with a second transmission to be used by the wireless communications component unit in selecting the selected radio frequency channel for wireless communications.

5. The base station of claim 1, wherein the channel survey component determines the signal power of one or more of the plurality of radio frequency channels based on signal power data received from the wireless communications device.

6. The base station of claim 1, wherein amount of noise calculated by the noise calculation component comprises an initial amount of noise associated with one or more of the plurality of radio frequency channels, and wherein the initial noise is externally sourced with respect to the base station.

7. The base station of claim 1, wherein the amount of noise calculated by the noise calculation component comprises a predicted amount of noise produced on one or more of the plurality of radio frequency channels associated with a prospective future wireless communication by the base station.

8. The base station of claim 1, wherein one or more of the plurality of radio frequency channels are associated with a first entity, and wherein the base station is associated with a second entity, and wherein a price is established for the base station's use of the selected radio frequency channel.

9. The base station of claim 8, further comprising a channel selection component that evaluates the price in selecting the selected radio frequency channel for wireless communications between the wireless communications device and the base station.

10. A wireless communications device equipped to measure radio frequency characteristics and communicate with a cognitive base station to facilitate wireless communications using a selected one of a plurality of radio frequency channels, each radio frequency channel using a different radio frequency, comprising:
    a radio frequency measurement component configured to measure radio frequency signal power associated with a plurality of different radio frequencies associated with the plurality of radio frequency channels;
    a base station cooperation component configured to receive channel identification data associated with the cognitive base station, the channel identification data identifying one or more radio frequency channels of the plurality of radio frequency channels for measurement by the wireless communications device;
    the base station cooperation component further configured to automatically initiate a radio frequency signal power measurement of identified radio frequency channels by the radio frequency measurement component;
    the base station cooperation component further configured to automatically send radio frequency measurements of the identified radio frequency channels to the cognitive base station; and
    an adaptive wireless communications component configured to send and receive communications data associated with the cognitive base station on a selected channel, wherein the selected channel is identified in a communication associated with the cognitive base station.

11. The wireless communications device of claim 10, further comprising a device locator configured to determine a location of the device, and wherein the base station cooperation component is further configured to send device location data to the cognitive base station.

12. The wireless communications device of claim 10, further comprising a noise calculation component that calculates an amount of noise associated with one or more of the plurality of radio frequency channels, and wherein the base station cooperation component is further configured to send noise data to the cognitive base station.

13. A method for mediating wireless communications network radio frequency channel use by first and second wireless service providers, comprising:
   identifying initial noise in a radio frequency channel used by the wireless communications network;
   calculating an initial capacity of the wireless communications network available to the first wireless service provider, wherein calculating the initial capacity accounts for the initial noise;
   determining an additional amount of noise caused by the second entity's use of the radio frequency channel;
   calculating reduced capacity of the wireless communications network available to the first wireless service provider, wherein calculating the reduced capacity accounts for the initial noise and the additional amount of noise caused by the second wireless service provider's use of the radio frequency channel;
   calculating a capacity difference between the initial capacity and the reduced capacity for the purpose of determining a price to be charged for the second wireless service provider's use of the radio frequency channel; and
   transmitting one or more of capacity difference information and price information across a network to mediate radio frequency channel use.

14. The method of claim 13, further comprising measuring the initial noise in the radio frequency channel and a signal power associated with the radio frequency channel for use in calculating the initial capacity.

15. The method of claim 13, further comprising receiving the initial noise in the radio frequency channel and a signal power associated with the radio frequency channel from one or more remote devices for use in calculating the initial capacity.

16. The method of claim 13, wherein the calculating a capacity difference is performed for a plurality of radio frequency channels for the purpose of determining a price for one or more of the plurality of radio frequency channels.

17. The method of claim 13, wherein the additional amount of noise caused by the second wireless service provider's use of the radio frequency channel comprises a prospective amount of noise produced by a predicted future wireless communication by the second entity.

18. The method of claim 13, further comprising determining the price to be charged by the first wireless service provider for use of the radio frequency channel.

19. The method of claim 13, further comprising selecting a radio frequency channel for wireless communications of the second wireless service provider.

20. The method of claim 13, further comprising receiving a selection identifying a radio frequency channel for wireless communications of the second wireless service provider.

21. A radio frequency mediation server configured to mediate wireless communications network radio frequency channel use by first and second wireless service providers, the server comprising:
   an initial capacity calculation component configured to calculate an initial capacity of the wireless communications network available to the first wireless service provider, wherein calculating the initial capacity accounts for the initial noise;
   an additional noise determination component configured to determine an additional amount of noise caused by the second entity's use of the radio frequency channel;
   a reduced capacity calculation component configured to calculate a reduced capacity of the wireless communications network available to the first wireless service provider, wherein calculating the reduced capacity accounts for the initial noise and the additional amount of noise caused by the second wireless service provider's use of the radio frequency channel; and
   a capacity difference calculation component configured to calculate a capacity difference between the initial capacity and the reduced capacity for the purpose of determining a price to be charged for the second wireless service provider's use of the radio frequency channel;
   wherein the server is configured to transmit one or more of capacity difference information and price information across a network to mediate radio frequency channel use.

22. The radio frequency mediation server of claim 21, wherein the initial capacity calculation component is configured to calculate an initial capacity of the wireless communications network using information received from one or more remote devices, the information comprising an initial noise in the radio frequency channel and a signal power associated with the radio frequency channel.

23. The radio frequency mediation server of claim 21, wherein the capacity difference calculation component is configured to calculate a capacity difference for a plurality of radio frequency channels for the purpose of determining a price for one or more of the plurality of radio frequency channels.

24. The radio frequency mediation server of claim 21, wherein the additional amount of noise caused by the second wireless service provider's use of the radio frequency channel comprises a prospective amount of noise produced by a predicted future wireless communication by the second entity.

25. The radio frequency mediation server of claim 21, further comprising a price determination component configured to determine the price to be charged by the first wireless service provider for use of the radio frequency channel.

26. The radio frequency mediation server of claim 21, further comprising a channel selection component configured to select a radio frequency channel for wireless communications of the second wireless service provider.

* * * * *